Feb. 26, 1957  A. P. IANUZZI  2,782,700
CAMERA MOUNTS

Filed May 21, 1953  2 Sheets-Sheet 1

INVENTOR.
Anthony Peter Ianuzzi
BY
ATTORNEYS

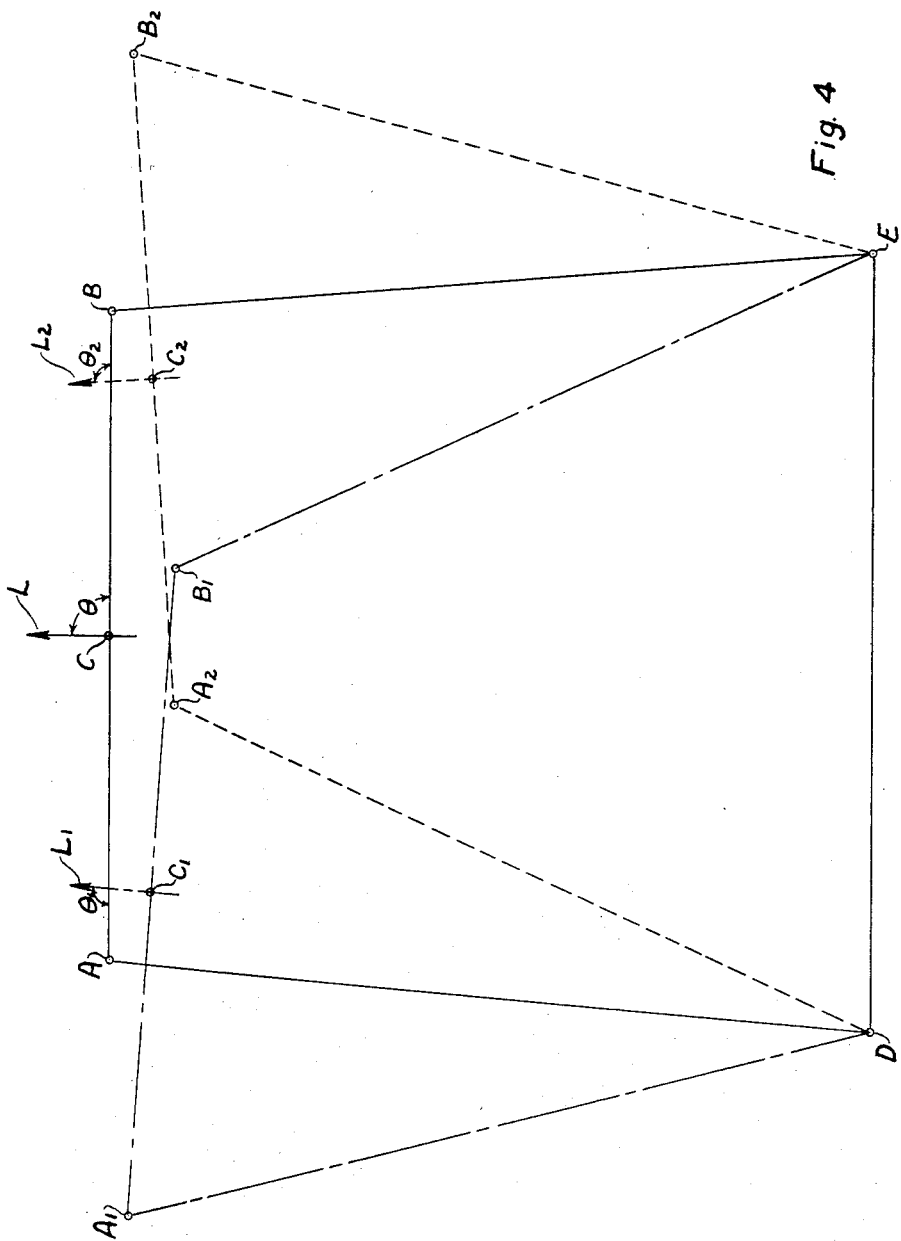

United States Patent Office 2,782,700
Patented Feb. 26, 1957

2,782,700

CAMERA MOUNTS

Anthony Peter Ianuzzi, Hollis, N. Y., assignor, by direct and mesne assignments, of seventy-three and one-half percent to Michael Myerberg, twenty percent to Arthur Gray, Jr., and two percent to Louis C. Blendermann, New York, N. Y., and two percent to Monide, Inc., one and one-fourth percent to Stewart F. Alexander, and one and one-fourth percent to Bernice Alexander Application May 21, 1953, Serial No. 356,431

5 Claims. (Cl. 95—18)

This invention relates to camera mounts and more specifically to a mount for taking stereoscopic pictures or other pictures having three dimensional effect.

An object of this invention is to provide a camera mount wherein two positions may be preselected and preset prior to photographing, obtaining converging optical axes at the two positions.

Another object is to provide a camera mount capable of adjusting and maintaining interoptical distance while not varying a preset plane of convergence.

Still another object of this invention is to provide a camera mount which will permit parallel movement of the optical axes of a camera which can be adjusted to obtain varying amounts of convergence of the optical axes when the camera is in displaced positions.

Another object of this invention is to provide a camera mount for stereoscopic photography wherein the plane of convergence may be preset and varied.

For a full and clear understanding of the invention, a detailed description of the mount will now be given in connection with the accompanying drawing, wherein:

Figure 4 is a diagrammatic view showing the device in three positions used in stereoscopic photography.

Figure 1:
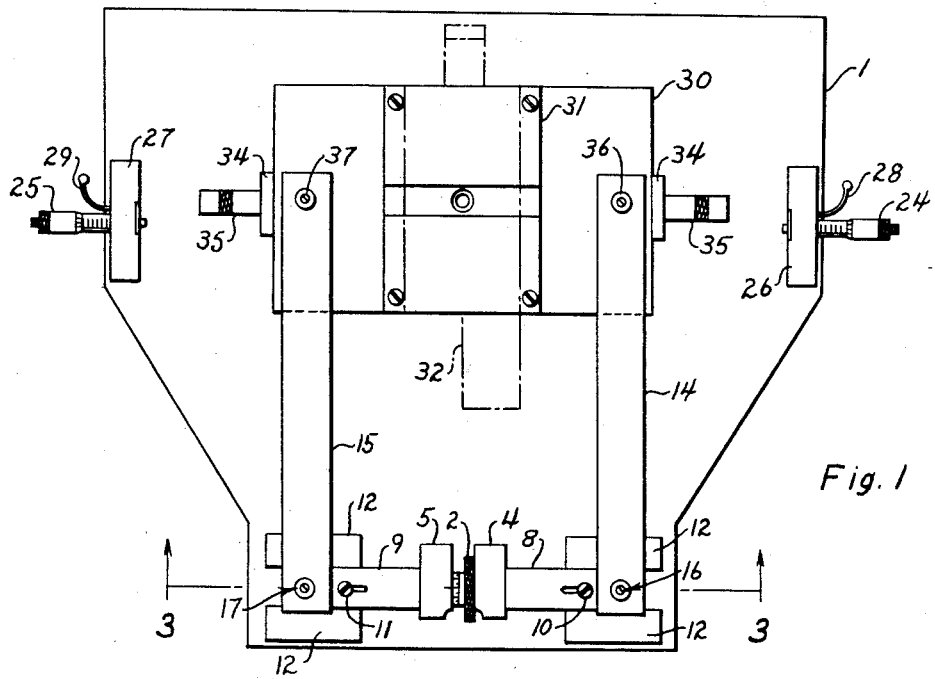
Figure 1 is a plan view of the device of the invention.
Figure 2:
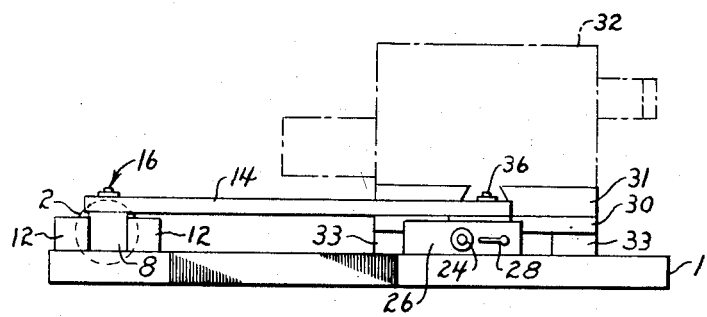
Figure 2 is a side elevation of the device of Figure 1.
Figure 3:
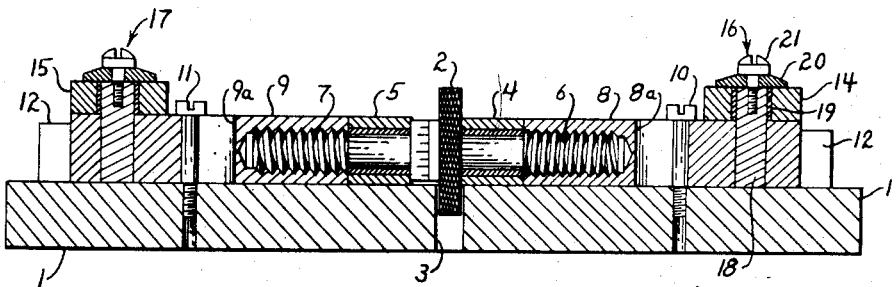
Figure 3 is an enlarged section taken on the line 3—3 of Figure 1.

Now, referring to the drawings, the camera mount has a base plate 1, upon which a compound screw micrometer 2 is mounted, the bottom of the center wheel extending into a slot 3 and the center wheel being held in position by a pair of mounting blocks 4 and 5. The screws 6 and 7 of the micrometer are threaded into pivot blocks 8 and 9, in which are slots 8a and 9a through which extend locking screws 10 and 11. A slideway is formed by a pair of guide blocks 12 in front and back of the sliding pivot blocks 8 and 9. The lock screws 10 and 11 are loosened to permit the micrometer adjustment, the amount of movement of the blocks being the same, but in different directions. The blocks 8 and 9 are also held in the slideway, formed by the blocks 12, by the screws 10 and 11.

A pair of identical arms 14 and 15 are joined to the pivot blocks 8 and 9 by the pivots 16 and 17 at one end, the other ends being joined to a sliding plate 30 by pivots 36 and 37. The pivots 16, 17, 36 and 37 are identical and comprise a drive pin 18 which is pressed into either the blocks 8 or 9 or the sliding plate 30, and a self oiling bushing 19 pressed in the arm. A pivot screw 21 extends through a washer 20 into the pin 18 to complete the pivot assembly.

Upon the sliding plate 30 is a camera plate 31 on which is mounted the camera 32, shown in phantom outline, a dovetail block on the camera base fitting in a dovetail groove formed in the plate 31. Fixed to the bottom surface of the sliding plate 30 are a plurality of blocks 33 which slide on the base plate 1 and which may be made of self oiling sintered metal for self lubrication or may have an external lubricant added.

At the sides of the base plate 1 are a pair of micrometer stop or gauge blocks 26 and 27 which carry micrometer screws 24 and 25 and the usual arms 28 and 29 for releasing the screws for adjustment and locking them in adjusted position. To provide for a wider range of adjustment than that afforded by the micrometers 24 and 25, a pair of strike plates 34 are mounted on the sides of the sliding plate 30 and carry spacers or stop plugs 35, which are provided in sets of different lengths, and are screwed into the strike plates and replaced, as required. As the sliding plate 30 is moved from side to side, the plugs abut the micrometers to limit the travel to a predetermined distance.

In Figure 4, the essential characteristics of the linkage are indicated in line diagrammatic form, the axes of the pivot points 37 and 36 being the points A and B, and the axes of the pivot points 17 and 16 being the points D and E. The optical axis L intersects the midpoint of the line A, B at point C and makes an angle $\theta$ therewith, which is a right angle.

The corresponding points are indicated in a leftward position of adjustment at $A_1$, etc., these points being joined by dot and dash lines, and in a rightward position of adjustment by points $A_2$, etc., these points being joined by broken lines. The extent of adjusting movement is exaggerated, so as to indicate the essential relationships more clearly. In Figure 4, the distance D, E is greater than the distance A, B, so that the linkage forms an isosceles trapezoid when in centered position. It will be observed that the angles $\theta_1$ and $\theta_2$ which the lines of sight $L_1$ and $L_2$ make with the line A, B are not right angles, but are, as indicated, obtuse angles, the lines $L_1$ and $L_2$ intersecting at a point on the original axis L and converging so as to simulate the convergence of the two eyes.

The variables to be controlled are the interoptical distance and the angle of convergence and these may be selected independently of each other at any desired value within any required range of adjustment. The interoptical distance (distance from point $C_1$ to point $C_2$) may be selected by setting the micrometers 24, 25 and using suitable spacer blocks 35 so as to determine the position of $A_1$ and $B_2$.

The angle of convergence is regulated by adjusting the points D and E, this angle increasing as the distance D, E is increased. In the particular case where distance D, E equals distance A, B, the linkage is a parallel linkage and lines of sight $L_1$ and $L_2$ will, accordingly, be parallel.

It should be noted that the point C is not necessarily the optical center of a camera lens system, and this center may be located either ahead of the point C along the line L or behind it. The effect of such location is merely to make the interoptical distance in the right and left hand positions of adjustment somewhat different from the distance $C_1$, $C_2$, but still proportional to this distance.

The apparatus may be used for making stereoscopic stills, in which case an exposure is made in each of the right and left hand positions, or it may be used for making three exposures to be projected and blended on a wide angle curved screen, as in the so called "Cinerama" projection system.

More typically, however, the apparatus is designed for making either two or three sets of exposures by step and repeat phootgraphy and thus producing three dimensional motion picture footage of subject matter such as puppets, the motion being introduced by progressively shifting the puppets by small positioning increments between the sets of exposures. In this work, the rigidity, reliability and simplicity of the apparatus are of the greatest value, as it is essential that the camera be returned precisely to the same position and that the optical axis be directed at precisely the same angle during each of a great number of repeated exposures.

What is claimed is:

1. A camera mount for taking stereoscopic pictures, comprising a bed plate and camera supporting member slidable thereon, stop means for limiting sliding movement of the supporting member at each of two predetermined locations, a trapezoidal linkage connected to the bed plate and camera supporting member and comprising a pair of bars, a pivot connecting one end of each bar to the camera supporting member, a pair of pivot blocks slidable on the bed plate and pivotally connected to the other ends of the said bars, a right and left hand screw threadably engaged in the pivot blocks for adjusting their position and a thrust member fixed to the bed plate for holding the screw against axial movement.

2. A camera mount for taking stereoscopic pictures, comprising a bed plate and camera supporting member slidable thereon, stop means for limiting sliding movement of the supporting member at each of two predetermined locations, a trapezoidal linkage connected to the bed plate and camera supporting member and comprising a pair of bars, a pivot connecting one end of each bar to the camera supporting member, a pair of pivot blocks slidable on the bed plate and pivotally connected to the other ends of the said bars, a right and left hand screw threadably engaged in the pivot blocks for adjusting their position, a thrust member fixed to the bed plate for holding the screw against axial movement, and means guiding the pivot blocks for movemnet in alignment with the screw axis.

3. A camera mount according to claim 2, comprising also means for locking the pivot blocks to the bed plate.

4. A camera mount for taking stereoscopic pictures, comprising a bed plate and camera supporting member slidable thereon, stop means for limiting sliding movement of the supporting member at each of two predetermined locations, a trapezoidal linkage connected to the bed plate and camera supporting member and comprising a pair of bars, a pivot connecting one end of each bar to the camera supporting member, a pair of pivot blocks slidable on the bed plate and pivotally connected to the other ends of the said bars, a right and left hand screw threadably engaged in the pivot blocks for adjusting their position, a central collar on the screw and thrust members on the bed plate abutting each side of the collar for holding the screw against axial movement.

5. A camera mount for taking stereoscopic pictures, comprising a bed plate and camera supporting member slidable thereon, a trapezoidal linkage connected to the bed plate and camera supporting member and comprising a pair of bars, a pivot connecting one end of each bar to the camera supporting member, a pair of pivot blocks adjustably mounted in the bed plate and pivotally connected to the other ends of the said bars, stop means for limiting sliding movement of the supporting member at each of two predetermined locations and a right and left hand screw threadably engaged in the said pivot blocks for setting the said pivot blocks at different distances apart for varying the angle of convergence of the optical axes.

References Cited in the file of this patent

UNITED STATES PATENTS

| | | |
|---|---|---|
| 2,150,932 | McDonnell | Mar. 21, 1939 |
| 2,175,114 | Friedmann et al. | Oct. 3, 1939 |